United States Patent [19]
Bickel et al.

[11] 3,920,638
[45] Nov. 18, 1975

[54] PROCESS FOR PREPARATION OF 7-AMINO-CEPHALOSPORANIC ACID COMPOUND

[75] Inventors: Hans Bickel, Binningen, Switzerland; Rolf Bosshardt, deceased, late of Arlesheim, Switzerland, by Ruth Elisabeth Bosshardt-Schär, legal representative; Bruno Fechtig, Reinach, Switzerland; Johannes Mueller, Arlesheim, Switzerland; Heinrich Peter, Riehen, Switzerland

[73] Assignee: Ciba-Geigy Corporation, Ardsley, N.Y.

[22] Filed: Sept. 7, 1973

[21] Appl. No.: 396,272

Related U.S. Application Data

[63] Continuation-in-part of Ser. No. 753,894, Aug. 20, 1968, abandoned.

[52] U.S. Cl. .............................. 260/243 C; 424/246
[51] Int. Cl.$^2$ ......................................... C07D 501/18
[58] Field of Search ............................... 260/243 C

[56] References Cited
UNITED STATES PATENTS

| | | | |
|---|---|---|---|
| 3,382,238 | 5/1968 | Dolfin ........................... | 260/243 C |
| 3,534,029 | 10/1970 | Beyerman et al. .............. | 260/243 C |
| 3,575,969 | 4/1971 | Morin et al. .................... | 260/243 C |
| 3,575,970 | 4/1971 | Weissenburger et al. ....... | 260/243 C |

*Primary Examiner*—Nicholas S. Rizzo
*Attorney, Agent, or Firm*—Joseph G. Kolodny; John J. Maitner; Theodore O. Groeger

[57] ABSTRACT

In the process for manufacturing 7-amino-cephalosporanic acid by converting a cephalosporin C silyl ester into a 7-imide-halide, converting the latter into the corresponding imino-ether and splitting the double bond of the latter, the step which comprises reacting the imide halide with the imino-ether at a temperature between −15° and + 30°C.

9 Claims, No Drawings

PROCESS FOR PREPARATION OF 7-AMINO-CEPHALOSPORANIC ACID COMPOUND

CROSS-REFERENCES TO RELATED APPLICATIONS

The present application is a continuation-in-part of our application Ser. No. 753,894, filed Aug. 20, 1968 now abandoned.

The subject of the application is a new process for the manufacture of 7-cephalosporanic acid (7-ACA).

It is known, for example from French Pat. No. 1,394,820, to manufacture 7-ACA by converting an N-protected cephalosprin C-diester into an imide-halide of formula I

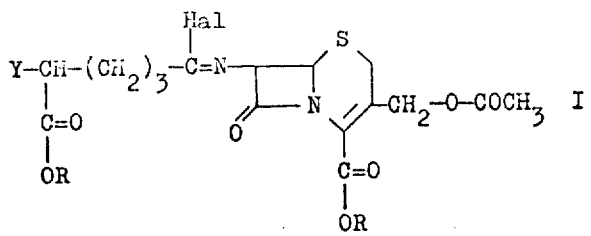

wherein Y is a protected amino group and OR are splittable ester groups, converting the imide-halide into a corresponding iminoether, for example lower alkylimino-ether, hydrolysing the iminoether and saponifying the resulting 7-ACA-ester to give the free acid.

In U.S. Pat. Nos. 3,499,909 and 3,575,970 there is described a process for the manufacture of 6-aminopenicillanic acid (6-APA) and 7-amino-cephalosporanic acid in which the ester used in the procedure of the above mentioned French patent is a silyl ester. The advantage thereof is that a separate splitting of the ester group is not necessary because the silyloxy group is split by alcoholysis during the conversion of the imide-halide into the imino-ether. In the U.S. patents it is disclosed that in order to get a good yield of 6-APA or 7-ACA, respectively, a temperature not greater than −20°C is required for the reaction of the imide-halide with the alcohol to form the imino-ether, and that preferably temperatures of about −40°C should be used for that step.

Surprisingly it has now been found that in the manufacture of 7-ACA shuch low temperatures are not indispensable and that rather a temperature between −15° and +30°C can be used in the step of the reaction of the imide-halide with an alcohol to form the iminoether.

Also in the other steps of the procedure, viz. the preparation of the imide-halide by rection of the cephalosporin C-diester with an imide-halide forming agent, for instancce phosphorus pentachloride, and in the splitting of the double bond of the imino-ether no temperatures lower than −20°C are required. The whole procedure can therefore be carried out at temperatures not lower than −20°C, for instance at temperatures of about −10° to 0°C. This is a great advantage because on a technical scale temperatures lower than −20° cannot be maintained with ordinary cooling means, such as salt-ice mixtures, and moreover special equipment is necesary because the normal technical equipment such as reaction vessels, becomes flawy at such low temperatures.

It is therefore an object of the present invention that in the process for the manufacture of 7-ACA wherein a cephalosporin C-silyl ester is converted into a corresponding imide halide, the latter converted in to iminoether by means of an alcohol and the C=N-double bond of the imino-ether split, the temperature at which the imidehalide is reacted with the alcohol is between −15° and +30°C.

It is a further object of the invention that in the process described in French Pat. No. 1,394,820 the ester group is a stannyl ester group.

It is still a further object of the invention that in the present process a heavy metal complex of cephalosporin C is used as starting material which is converted to the silyl or stannyl ester and then to the imide halide thereof, which in turn is converted into the iminoether, and the latter is split in order to yield 7-ACA.

The new process offers very valuable possibilities of being carried out simply and with the usual technical equipment on a large industrial scale. Thus an appropriate procedure is to form the imide-halide to be used as the starting substance in the same reaction medium in which the formation of the iminoether and its hydrolysis to the 7-ACA is also effected using ice or ice-salt mixture for cooling. The 7-ACA crystallises directly from the solution, preferably at a pH of 3-4. It is of such purity (unitary according to thin layer chromatography) that it can be used directly for the acylation at the 7-amino group.

Possible N-protective groups in the residue Y are for example to those mentioned in French Pat. No. 1,394,820 and groups known as amino-protective groups in the art, especially from the field of aminoacids and peptides. The choice of this protective group is not critical since the group does not have to be split off but is split off with the whole side-chain on splitting of the imino-ether double bound.

Useful for blocking an amino group is, for example, a lower alkyl, aryl or acyl radical, advantageously a radical which reduces the basicity of the amino group. The aryl radicals, for example, naphthyl or phenyl radicals, may be unsubstituted or substituted, for example by halogen atoms, nitro, cyano, sulfo, carbamoyl, esterified carboxyl, lower alkylcarbonyl or lower alkoxycarbonyl groups; especially suitable are the 2:4-dinitrophenyl, the 2:4:6-trinitrophenyl, the 2:4-dinitro-6-methoxy-phenyl, the 4-cyanophenyl and the 4-carbomethoxy-phenyl radical. Acyl radicals are more especially optionally substituted lower alkanoyl radical with up to 6 carbon atoms, for example acetyl, propionyl, butyryl, also aroyl radicals, such as benzoyl, as well as benzoyl substituted by nitro, cyano, sulfo groups, halogen atoms, lower alkyl or lower alkoxy groups, and preferably N:N-phthaloyl; furthermore, aryl-lower alkanoyl radicals, such as phenylacetyl, or the carbobenzoxy or tertiary butyloxycarbonyl radical or the benzenesulfonyl or toluenesulfonyl radical may be used for blocking the amino group. The amino groups may also be blocked by protonation.

It is however appropriate and possible also to use, as the amino protective group, the silyl or stannyl residue which is also present in the ester group. The N-silyl or stannyl group can be introduced under the same conditions as the corresponding ester group.

The ester groups are groups of formula

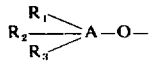

wherein A represents Si or Sn and $R_1$, $R_2$ and $R_3$ each is a member selected from the group consisting of lower alkyl, phenyl, phenyl-lower alkyl, for example benzyl and cycloalkyl having 5–7 carbon atoms. $R_1$, $R_2$ and $R_3$ are preferably identical and represent methyl or ethyl, when A is Si, or n-butyl, when A is Sn.

The imide halide of formula I can be manufactured according to known methods. Thus for example the ester group, and optionally an amino protective group can be introduced into cephalosporin C or into a cephalosporin C protected at the amino group or into one of its salts, for example the monosodium salt or the zinc salt (zinc complex), or the amino group may be protonized and the compound then converted to the imide halide. The introduction of the ester groups and optionally of an N-silyl or N-stannyl protective group is for example effected with a compound of formula

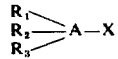

wherein A, $R_1$, $R_2$ and $R_3$ have the above significance and X represents halogen, especially chlorine.

For example, the sodium salt of cephalosporin C or a di-sodium salt of cephalosporin C protected at the amino group, for example N,N-phthaloyl- or N-2,4,6-trinitrophenylcephalosprin C-disodium salt, is reacted with chlorotrimethylsilane or tri-n-butyl-tin chloride. In order to introduce the silyl ester group cephalosporin C can also be reacted with hexamethylsilazine or N-trimethylsilyldiethylamine or with bis-trimethylsilylacetamide or trimethylsilyl-N-methylacetamide, whilst the stannyl residue can also be introduced by means of the corresponding stannyl hydroxide or distannyl oxide. The reactions are effected in the absence of water and alcohol, in an inert organic solvent such as hydrocarbons, for example benzene or toluene, or halogenated, especially chlorinated hydrocarbons such as chloroform or methylene chloride, or ethers such as dioxan, tetra-hydrofuran or ethylene glycol dimethyl ether or nitriles such as acetonitrile, preferably at room temperature or at slightly elevated temperature (up to 60°C).

The conversion of the protected compound into the imide halide is effected according to known methods, for example as described in French Pat. No. 1,394,820, by reaction with reagents which form imide halides, such as acid halides, especially acid chlorides, derived from phosphorus, sulfur, carbon or their oxygen-containing acids, for example phosphorus oxychloride, phosphorus trichloride, thionyl chloride, phosgene, oxalyl chloride, pyrocatechyl-phosphorus trichloride and above all with phosphorus pentachloride. The reaction is preferably carried out in the above-mentioned inert organic solvents especially methylene chloride, and in the presence of a base, more especially a tertiary amine, for example an N,N,N-tri-lower alkyl-amine, e.g. triethylamine or ethyldiisoproylamine, N-methylmorpholine, chinoline, isochinoline, or especially pyridine or dimethylaniline. The molar proportion of the cephalosporin starting material: imide halide-forming reagent: base, such as a cephalosporin silyl ester: phosphorus pentachloride: pyridine, is preferably about 1:2:10. The temperature should be about −20° to −5°C.

According to the invention the imide halide is then reacted, at a temperature between −15° and +30°C, with an alcohol of the formula ROH wherein R is selected from the group consisting of lower alkyl, lower alkyl substituted by halogen, and phenyl-lower alkyl. The alcohol is for instance ethanol n-butanol, 2,2,2-trichlorethanol, benzyl alcohol, preferably methanol. The splitting of the C=N double bond of the imino ether to form the desired amino compound is carried out with a compound containing a hydroxyl group, preferably by hydrolysis, as well as by alcoholysis such as treatment with water, as well as with an alcohol, for instance one of those used for the formation of the imino ether, or with a mixture of alcohol with water, preferably in an acidic medium, e.g. at a pH value from 0 to 4, which may be attained by adding a buffer solution.

It is of advantage to use in the above process as starting material a heavy metal complex of cephalosporin C. Such complexes and their preparation are described in U.S. Pat. No. 3,661,901. They are readily obtained in pure, microcristalline form. As heavy metals particularly suitable are divalent metals selected from the group consisting of copper, nickel, lead, cobalt, iron, manganese, mercury, cadmium and in the first line zinc.

The following examples illustrate the invention.

The following systems are used for the thin layer chromatography (on silica gel):

System 52A: n-Butanol-glacial acetic acid-water (67:10:23)

System 101B: n-Butanol-pyridine-glacial acetic acid-water (40:24:6:30)

System 110: Ethyl acetate-n-butanol-pyridine-glacial acetic acid-water (42:21:21:6:10).

EXAMPLE 1

5.50 g of N,N-phthaloyl-cephalosporine C (66% purity) are suspended in 150 ml of absolute methylene chloride and 16,3 ml of a solution of methylene chloride containing 4.1 g of bis-trimethylsilylacetamide (0.02 mol) are added with stirring and exclusion of moisture. Rapid solution of the suspended material takes place and after 15 minutes' stirring at 30°–35°C a clear golden yellow solution results. After cooling to −10°C 16.14 ml of pyridine of −10°C are added to the reaction solution, followed by 104.2 ml of a 10% strength suspension of phosphorus pentachloride in absolute methylene chloride (w/v, 10.42 g, 0.05 mol) cooled to −10°C. The solution is stirred for 40 minutes at −10° to −13°C, whereupon it turns dark brown.

Hereafter 100 ml of ice-cooled absolute methanol are rapidly added and the mixture is stirred for a further 15 minutes at −10°C. A solution of 4.8 ml of phosphoric acid (85% strength) in 40 ml of water is then added and after 15 minutes the pH of the solution is adjusted to 3.5 with pyridine. The solution is cooled for 90 minutes in an ice bath and filtered. In order to remove pyridinium salts the slightly yellowish precipitate is thoroughly washed with methanol and methylene chloride. 7-ACA which is pure according to a thin layer chromatogram remains on the filter in a yield of 82.4%, and is dried in vacuo at room temperature.

EXAMPLE 2

8.31 g of 86% purity cephalosporin C (free acid) in 700 ml of absolute methylene chloride are reacted with 9.67 ml (0.12 mol) of absolute pyridine and 18.45 ml (0.146 mol) of trimethylchlorosilane. A clear light yellow solution is produced within a few minutes, and after 2 hours at 30°C this is reacted with 21.74 ml (0.27 mol) of absolute pyridine and a 10% strength solution of 14.2 g (68 mmols) of phosphorus pentachloride in methylene chloride so that the temperature does not rise above −10°C. The mixture is stirred for 30 minutes at −10°, then poured into 250 ml of absolute methanol of −15°C and allowed to stand for 10 minutes at −5°C. The pH-value of the reaction mixture is then raised to 3.3 by means of triethylamine, whereupon a fine precipitate begins to separate out. After 90 minutes' cooling in an ice bath the supernatant almost clear solution is filtered. The remaining sludge-like and cream-colored precipitate can thereafter be suction-filtered. After repeated washing with methanol and then with methylene chloride and ether a silghtly ream-colored product is obtained which is dried for 2 hours in a high vacuum: 3.99 g. The resulting 7-ACA is 90% pure according to the ultra-violet spectrum: $\lambda_{max} = 264$ m$\mu$ ($\epsilon = 7,450$); $\lambda_{min} = 226$ m$\mu$ ($\epsilon = 5,000$). Further quantities of almost colorless 7-ACA are isolated from the methanolic rinsing solutions.

EXAMPLE 3

3.28 of N,N-phthaloyl-cephalosporin C are suspended in 200 ml of absolute methylene chloride and 1.59 ml of absolute pyridine are added. The initially sticky mass dissolves within about 10 minutes on stirring with a vibro mixer, to form a clear light yellow solution. 2.59 ml of trimethylchlorosilane are added thereto and the reaction solution is allowed to stand overnight (15 hours) at room temperature under nitrogen. 6.04 ml of absolute pyridine and 39.3 ml of a 10% strength solution of phosphorus pentachloride in absolute methylene chloride are then added at −20°C and the mixture is allowed to react for 40 minutes at −12 to −13°C. 115 ml of absolute methanol of −15°C are added and the mixture is allowed to react for 10 minutes at −10°C, whereupon a golden yellow solution results. The pH is now brought to 3.35 by means of triethylamine, whereupon fine material begins to precipitate. After 1½ hours' stirring whilst cooling in ice the material is filtered through a G4 fritted glass filter and the very slightly cream-colored precipitate on the frit is washed with methylene chloride and with ether and is briefly dried in a vacuum desiccator. The 7-ACA thus obtained shows the following in the ultraviloet spectrum: $\lambda_{max} = 263$ m$\mu$ ($\epsilon = 8,350$) in 0.1 N NaHCO$_3$; given a standard of 8,500, this corresponds to a purity of 98.3%. The yield is 1.354 g of 98.3% purity product (88% of theory).

EXAMPLE 4

2.57 g (4.1 mmols) of N-trinitrophenyl-cephalosporin C (about 80% pure) are suspended in 200 ml of absolute methylene chloride and 9.18 ml of absolute 3-picoline and 5.44 ml of trimethylchlorosilane are added. The clear orange-colored solution is allowed to finish reacting over the course of 2 hours at 30°C. Then it is cooled to −20°C and 29.1 ml of a 10% strength solution of phosphorus pentachloride in absolute methylene chlorid are allowed to run in. The mixture is allowed to react for 40 minutes at about −12°C with gentle stirring. The intensely colored solution is then cooled to −15°C and added to 65 ml of absolute methanol of −20°C, during which the temperature rises to −10°C. The mixture is allowed to complete reacting for 10 minutes at −10°C. The pH of the solution is then adjusted to 3.35 by addition of triethylamine. The reaction mixture is cooled for 90 minutes in an ice bath. The precipitate is filtered off by means of a G4-fritted glass filter and washed with methylene chloride and ether and dried in a desiccator. 0.694 g of 7-ACA is obtained. In the ultra-violet spectrum in 0.1N NaHCO$_3$, $\lambda_{max} = 264$ m$\mu$ ($\epsilon = 8,150$); $\lambda_{min} = 223$ m$\mu$ ($\epsilon = 4,700$); Rf A = 0.10; Rf 101B = 0.033; Rf 110 = 0.18.

EXAMPLE 5

4.375 g of anhydrous cephalosporin C-sodium salt (10.0 mmols) are suspended in 300 ml of absolute methylene chloride and 23.2 ml of absolute quinoline and 9.25 ml of trimethylchlorosilane are added. The suspension is allowed to react for 2 hours at 30°C whilst flushing with dry nitrogen and stirring vigorously. It is then cooled to −20°C and 65.6 ml of a 10% strength solution of phosphorus pentachloride in methylene chloride are added, during which the internal temperature does not rise above −10°C. The solution is stirred for 40 minutes at about −12°C. After renewed cooling to −20°C 120 ml of absolute methanol are allowed to run in rapidly, during which the internal temperature rises to −10°C. The mixture is allowed to complete reacting for 10 minutes at this temperature.

The pH is then adjusted to 3.35 by adding triethylamine. The reaction mixture is allowed to stand for 90 minutes in an ice bath, during the course of which the fine precipitated material settles out. The precipitate is filtered off and washed with methylene chloride. The crude product is repeatedly washed on the filter with water, then with methanol and finally with ether and is dried in a vacuum desiccator (1.98 g). The 7-ACA shows a purity of 90.5% ($\lambda_{max} = 264$ [$\epsilon = 7500$]).

EXAMPLE 6

6.0 g of an at most 38% pure crude precipitate of cephalosporin-C-triethylammonium salt (ultra-violet: $\lambda_{max} = 257$ m$\mu$ ($\epsilon = 3,300$) in 0.1 N NaHCO$_3$) are suspended in 700 ml of absolute methylene chloride and are allowed to react for 2 hours at 30°C after adding 29.0 ml of absolute 2-picoline and 17.1 ml of trimethylchlorosilane. After cooling to −15° 103 ml of a 10% strength solution of phosphorus pentachloride in absolute methylene chloride are added. The dark yellow clear solution is allowed to stand for 40 minutes at −12°C. It is then run into 162 ml of absolute methanol of −20°C. The reaction mixture is stirred for 5 minutes at −10°C. The pH of the solution is then raised to 3.3 by means of aqueous ammonia. After 90 minutes' cooling in an ice bath the precipitate is filtered off, successively washed with water/methanol, methylene chloride and ether, and dried in a high vacuum over phosphorus pentoxide. Almost colorless 7-amino-cephalosporanic acid is obtained, showing a purity of 74% on the basis of ultra-violet extinction. The inorganic salts present as impurities in this product are removed by suspending the crude 7-ACA in a little water, filtering off, washing initially with a little water and then with methanol and ether, and drying in vacuo. The product thus obtained shows the following in the ultraviolet spectrum in 0.1 N NaHCO$_3$: $\lambda_{max} = 264$ m$\mu$ ($\epsilon = 7,9000$); $\lambda_{min} = 223$ m$\mu$ ($\epsilon = 4,650$).

EXAMPLE 7

4.04 g of about 91.5% purity phthaloyl-cephalosporin C are suspended in 200 ml of absolute methylene chloride and 12,1 ml of absolute pyridine and 3.12 ml of dimethyl dichlorosilane ($n=1.404$) are added. After 2 hours' stirring at 30°C the clear lemon yellow solution is cooled to −20°C and 65.5 ml of an 8% strength solution of phosphorus pentachloride in absolute methylene chloride added. After 40 minutes at −12°C the solution is again cooled to −20°C. Thereafter 90 ml of absolute methanol are allowed to run in, during which the internal temperature is not allowed to rise to above −10°C. The golden yellow solution is further stirred for 10 minutes at −10°C. The pH is thereafter raised to 3.35 by means of triethylamine. After 90 minutes' cooling in an ice bath the fine precipitate is filtered off and washed on the filter plate with methylene chloride, methanol and ether. After drying in a vacuum desiccator 1.492 g of white product are obtained, showing a purity of 99.5% according to the ultra-violet extinction of 263 m$\mu$ (ultra-violet: $\lambda_{max} = 263$ m$\mu$ ($\epsilon = 8,250$); $\epsilon_{min} = 223$ m$\mu$ ($\epsilon = 4,800$) in 0.1 N NaHCO$_3$).

EXAMPLE 8

50.0 g of the zinc complex of pure cephalosporin C are suspended in 1200 ml of methylene chloride. 110 ml of N,N-dimethylaniline and 117 ml of trimethylchlorosilane are added and the mixture is then stirred for 45 minutes at room temperature. The solution is cooled to −15°C and a suspension of 43.55 g of phosphorus pentachloride in methylene chloride is then passed in without raise of the temperature to more then −10°C and the mixture is further stirred for 45 minutes at −10°C. The reaction mixture is then rapidly passed into 1000 ml of methanol of −5°C and allowed to continue to react for 15 minutes at +5°C. A pH of 3.3 is established by addition of 200 ml of triethylamine. The suspension is allowed to stand for 30 minutes at 20°-25°C and is subsequently filtered through a glass suction filter. The residue is washed first with methanol, then with diethyl ether, and dried in vacuo to give 24,75 g of crystalline 7-ACA (=87% of theory).

In order to determine in which way the yield of 7-ACA depends on the temperature at which the imide chloride is reacted with methanol to form the iminoether, the above example was repeated several times in the same manner, except that pyridine was used as the base instead of dimethylaniline and the temperature of the reaction of the imide chloride with methanol was changed. The following table indicates the starting and end temperatures of that reaction and the yields of crystalline 7-ACA obtained.

Table

| Temperature | | Yield in % |
|---|---|---|
| starting | end | |
| −20°C | −11° | 87.2 |
| −20°C | −10° | 87.4 |
| 0°C | +15° | 88.2 |
| 0°C | +13° | 86.0 |
| +20°C | +28° | 81.7 |
| +20°C | +29° | 81.1 |

EXAMPLE 9

18.0 g of N-phthalyl-cephalosporin C are suspended in 1000 ml of methylene chloride and 64.5 ml of N,N-dimethylaniline added. The clear solution is treated with 14.3 ml of trimethylchlorosilane and the mixture is stirred for 2 hours at room temperature, then cooled to −20°C, a suspension of 21.6 g of PCl$_5$ inmethylene chloride added, and allowed to react for 45 minutes at −10°C. The reaction mixture is rapidly poured into 1000 ml of methanol fo 0°C. The batch is stirred for 15 minutes at +10°C and a pH of 3 is established by addition of triethylamine. After it has stood for 30 minutes, at 20°C the suspension is filtered through a glass suction filter G4 and the cream coloured precipitate on the filter is washed with methanol and diethyl ether and dried in vacuo. The yield of pure 7-ACA is 7.4 g (=89% of theory).

EXAMPLE 10

2.75 g of at most 91.5% pure phthalyl-cephalosporin C[ultra-violet:$\lambda_{max} = 263$ m$\mu$ ($\epsilon = 7,600$) in 95% strength ethanol] are suspended in 150 ml of chloroform and dissolved by brief stirring with 1.26 ml of absolute pyridine. After adding 4.42 ml of tri-n-butyl-tin chloride the slightly yellowish-colored solution is allowed to stand overnight at room temperature.

It is then cooled to below −20°C and 5.43 ml of absolute pyridine are added, followed by 44.3 ml of an 8% strength solution of phosphorus pentachloride in absolute methylene chloride. The mixture is stirred for 49 minutes at −12°C. After renewed cooling to below −20°C, 60.6 ml of absolute methanol are allowed to run in over the course of a few minutes. After 30 minutes at −10°C and a further 30 minutes reaction time at room temperature a clear golden yellow solution is obtained.

For purposes of hydrolysis, 10 ml of 25% strength aqueous formic acid are added and the pH-value is raised from 1.6 to 2.0 by adding 1.4 ml of triethylamine. After about 20 minutes' stirring at room temperature a fine precipitate begins to separate out. After 2½ hours the pH of the suspension is raised to 3.3 by adding a further 9 ml of triethylamine and the mixture is allowed to stand for 90 minutes in an ice bath. The precipitate is filtered off, washed with methanol, methylene chloride and ether and dried in a high vacuum. The resulting colorless 7-ACA, which in the ultra-violet (in 0.1 N NaHCO$_3$) shows an extinction at 263 m$\lambda$ of 8,450, cannot be distinguished from authentic 7-ACA by thin layer chromatography.

We claim:

1. In a process for the manufacture of 7-amino-cephalosporanic acid by converting cephalosporin C into an imide halide of the formula I

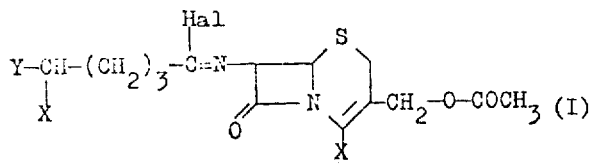

wherein Y represents a protected amino group, X is an esterified carboxyl group of the formula

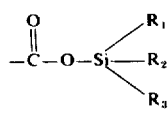

in which each of $R_1$, $R_2$ and $R_3$ is a member selected from the group consisting of lower alkyl, phenyl, phenyl-lower alkyl, and cycloalkyl having 5–7 carbon atoms, and Hal is halogen, converting the imide halide into a corresponding imino-ether by means of an alcohol of the formula ROH wherein R is selected from the group consisting of lower alkyl, lower alkyl substituted by halogen, and phenyl-lower alkyl, splitting the double bond of the imino-ether under acid conditions with a compound selected from the group consisting of water and a hydroxyl containing compound and removing the ester group, the improvement wherein the imide-halide is reacted with the alcohol ROH at a temperature between $-15°$ and $+30°C$.

2. In a process for the manufacture of 7-amino-cephalosporanic acid by converting cephalosporin C into an imide halide of the formula Ia

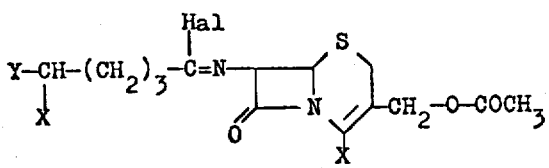

(Ia)

wherein Y represents a protected amino group, X is an esterified carboxyl group and Hal is halogen, converting the imide-halide into a corresponding imino-ether by means of an alcohol of the formula ROH wherein R is selected from the group consisting of lower alkyl, lower alkyl substituted by halogen, and phenyl-lower alkyl, splitting the double bond of the imino-ether under acid conditions with a compound selected from the group consisting of water and a hydroxyl containing compound and removing the ester group, the improvement wherein X is an esterified carboxyl group of the formula

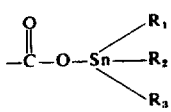

in which each of $R_1$, $R_2$ and $R_3$ is a member selected from the group consisting of lower alkyl, phenyl, phenyl-lower alkyl, and cycloalkyl having 5–7 carbon atoms.

3. In a process for the manufacture of 7-amino-cephalosporanic acid by converting cephalosporin C into an imide halide of the formula Ib

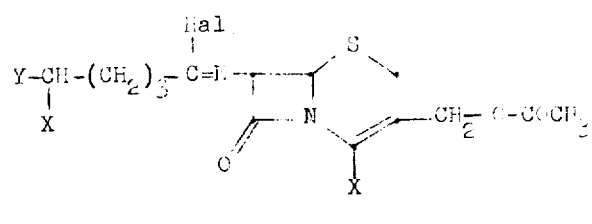

(Ib)

wherein Y represents a protected amino group, X is esterified carboxyl group and Hal is halogen, converting the imide-halide into a corresponding imino-ether by means of an alcohol of the formula ROH wherein R is selected from the group consisting of lower alkyl, lower alkyl substituted by halogen, and phenyl-lower alkyl, splitting the double bond of the imino ether under acid conditions with a compound selected from the group consisting of water and a hydroxyl containing compound and removing the ester group, the step which comprises treating a heavy metal complex of cephalosporin C containing a divalent heavy metal selected from the group consisting of copper, nickel, lead, cobalt, iron, cadmium, mercury and zinc with a silylating or stannylating agent derived from an alcohol of the formula

in which A is Si or Sn and each of $R_1$, $R_2$ and $R_3$ is a member selected from the group consisting of lower alkyl, phenyl-lower alkyl, and cycloalkyl having 5–7 carbon atoms, converting the thus obtained compound into an imide-halide of the formula Ib, converting the latter into an imino-ether by treating it with an alcohol of the formula ROH as defined above and splitting the double bond of the imino-ether.

4. Process as claimed in claim 1, wherein in a compound of formula 1 X represents the trimethyl-silyloxy group.

5. Process as claimed in claim 2, wherein in a compound of formula Ib X represents the tri-(n-butyl)-stannyloxy group.

6. Process as claimed in claim 1, wherein in a compound of formula I Y represents an N-silylamino group of the formula

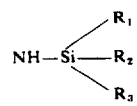

in which $R_1$, $R_2$ and $R_3$ have the same meaning as defined in claim 1.

7. Process as claimed in claim 1, wherein in a compound of formula I Y represents the group $NH_3^+$.

8. Process as claimed in claim 3, wherein the zinc complex of cephalosporin C is used as starting material.

9. Process as claimed in claim 1, wherein methanol is used as the alcohol to convert the imide halide into the imino-ether.

* * * * *